United States Patent
Redler, IV et al.

(10) Patent No.: US 10,965,608 B2
(45) Date of Patent: Mar. 30, 2021

(54) MOBILE SUPERCLOUD COMPUTING SYSTEM AND METHOD

(71) Applicant: Keepsayk LLC, Glen Ellyn, IL (US)

(72) Inventors: Steve Redler, IV, Milltown, NJ (US); Steven Landers, Mount Claremont (AU)

(73) Assignee: KEEPSAYK LLC, Glenn Ellyn, IL (US)

( * ) Notice: Subject to any disclaimer, the term of this patent is extended or adjusted under 35 U.S.C. 154(b) by 0 days.

(21) Appl. No.: 14/749,307

(22) Filed: Jun. 24, 2015

(65) Prior Publication Data

US 2015/0372939 A1    Dec. 24, 2015

Related U.S. Application Data

(60) Provisional application No. 62/016,602, filed on Jun. 24, 2014.

(51) Int. Cl.
| | | |
|---|---|---|
| *H04L 12/911* | (2013.01) | |
| *H04L 29/08* | (2006.01) | |
| *H04L 29/14* | (2006.01) | |
| *H04L 29/06* | (2006.01) | |

(52) U.S. Cl.
CPC .............. *H04L 47/70* (2013.01); *H04L 67/10* (2013.01); *H04L 67/1095* (2013.01); *H04L 67/42* (2013.01); *H04L 69/40* (2013.01); *H04L 67/02* (2013.01)

(58) Field of Classification Search
CPC ..... H04L 47/70; H04L 67/1095; H04L 69/40; H04L 67/42; H04L 67/10; H04L 67/02

USPC ......................................................... 709/226
See application file for complete search history.

(56) References Cited

U.S. PATENT DOCUMENTS

| | | | |
|---|---|---|---|
| 6,957,224 B1 | 10/2005 | Megiddo | |
| 7,689,909 B1 | 3/2010 | Szuszczewicz | |
| 8,336,047 B2* | 12/2012 | Van Hensbergen | .. G06F 9/5072 709/226 |
| 8,543,715 B1 | 9/2013 | Rabbat | |
| 8,650,159 B1* | 2/2014 | Zhang ............... | G06F 17/30194 707/664 |
| 8,745,434 B2* | 6/2014 | Yang ..................... | G06F 9/5072 709/226 |
| 8,909,757 B1* | 12/2014 | Yiu ................... | G06F 17/30899 709/223 |

(Continued)

OTHER PUBLICATIONS

Lewis, Rhys et al., Dereferencing HTTP URIs, publisher: www.w3.orgb; published: Aug. 2007 (20 pgs).

(Continued)

*Primary Examiner* — Abdullahi E Salad
(74) *Attorney, Agent, or Firm* — DLA Piper LLP (US)

(57) ABSTRACT

A mobile supercloud system and method are provided that can improve upon the complexity regarding synchronization and sharing of data with others over the cloud. Embodiments can provide systems that can be quickly responsive to changes made to data on the client device, and which can automatically propagate those changes wherever needed. The system can combine the resources of multiple cloud services together with the computational and storage resources resident on the mobile device, and a system whereby the user's device can participate in completing the restoration of state on the server after catastrophic failure on the server-side.

3 Claims, 3 Drawing Sheets

(56) References Cited

U.S. PATENT DOCUMENTS

| | | |
|---|---|---|
| 9,083,729 B1 | 7/2015 | Doshi |
| 2003/0120669 A1 | 6/2003 | Han et al. |
| 2003/0208472 A1 | 11/2003 | Pham |
| 2006/0053370 A1 | 3/2006 | Hitaka |
| 2006/0109517 A1 | 5/2006 | Catalan |
| 2006/0259858 A1 | 11/2006 | Collins |
| 2008/0114868 A1 | 5/2008 | Thayer |
| 2008/0209327 A1 | 8/2008 | Drucker |
| 2008/0215965 A1 | 9/2008 | Abrams |
| 2009/0287990 A1 | 11/2009 | Lynton |
| 2009/0313320 A1 | 12/2009 | Parsons |
| 2010/0199227 A1 | 8/2010 | Xiao |
| 2010/0205196 A1 | 8/2010 | Schreiber |
| 2010/0248698 A1* | 9/2010 | In .................... G06F 9/5072 455/414.1 |
| 2010/0332454 A1* | 12/2010 | Prahlad ............... G06F 17/302 707/654 |
| 2011/0055161 A1* | 3/2011 | Wolfe ............. G06F 17/30315 707/652 |
| 2011/0320520 A1* | 12/2011 | Jain ................... G06F 9/5072 709/203 |
| 2012/0131193 A1* | 5/2012 | Ferris ................. G06F 9/5072 709/226 |
| 2012/0143951 A1* | 6/2012 | Hacigumus ............ G06F 9/544 709/204 |
| 2012/0151074 A1* | 6/2012 | Wood .................. H04L 63/0823 709/228 |
| 2012/0166645 A1* | 6/2012 | Boldyrev ............. G06F 9/5083 709/226 |
| 2012/0239731 A1 | 9/2012 | Shyamsunder |
| 2012/0258777 A1* | 10/2012 | Huang .................. H04W 4/60 455/557 |
| 2012/0284314 A1* | 11/2012 | Nagpal ............ G06F 17/30371 707/822 |
| 2012/0297249 A1* | 11/2012 | Yang ................... G06F 9/5072 714/19 |
| 2013/0013767 A1 | 1/2013 | Stober et al. |
| 2013/0024757 A1 | 1/2013 | Doll |
| 2013/0054634 A1* | 2/2013 | Chakraborty ....... H04L 67/1091 707/769 |
| 2013/0073998 A1 | 3/2013 | Migos |
| 2013/0080613 A1* | 3/2013 | Thireault ............. G06F 9/5027 709/223 |
| 2014/0006843 A1* | 1/2014 | Kim ................... G06F 11/2002 714/4.1 |
| 2014/0073370 A1 | 3/2014 | Lee |
| 2014/0101102 A1 | 4/2014 | Baumgarten |
| 2014/0229582 A1* | 8/2014 | Liu ........................ H04L 67/06 709/219 |
| 2014/0344415 A1* | 11/2014 | Liu ....................... H04L 65/607 709/219 |
| 2015/0106428 A1* | 4/2015 | Elias ...................... H04L 67/42 709/203 |
| 2015/0106511 A1* | 4/2015 | Astigarraga ............ H04L 43/16 709/224 |
| 2015/0106946 A1* | 4/2015 | Soman .................. G06F 21/602 726/26 |
| 2015/0134817 A1* | 5/2015 | Edwards ................ H04L 47/70 709/225 |
| 2015/0169419 A1* | 6/2015 | Carney ................... H04L 69/00 714/4.11 |
| 2015/0237128 A1* | 8/2015 | Castro ................. H04L 67/1095 709/203 |
| 2016/0044035 A1* | 2/2016 | Huang ................ H04L 63/0272 726/4 |
| 2016/0100013 A1* | 4/2016 | Vijayan .................. G06F 21/60 709/219 |

OTHER PUBLICATIONS

Pasini, Mike, Tabblo—Poster Layouts For Your Pix, dated Sep. 2006 (9 pgs).

Stewart, Craig, The 21 Best Photo Collage Maker Tools, dated Mar. 15, 2017 (22 pgs).

Rockwell, Rick, The Best iPhone Apps For Scrapbooking, dated May 21, 2017 (10 pgs).

* cited by examiner

MOBILE SUPERCLOUD COMPUTING SYSTEM AND METHOD

PRIORITY CLAIMS/RELATED APPLICATIONS

This application claims priority under 35 USC 120 and the benefit under 35 USC 119(e) to U.S. Provisional Patent Application Ser. No. 62/016,602 filed on Jun. 24, 2014 and entitled "Mobile Supercloud Computing", the entirety of which is incorporated herein by reference.

FIELD

The disclosure relates generally to cloud based systems.

BACKGROUND

Today's cloud-based web applications tend to share a common architecture. That architecture is driven by the desire, on the part of the application developer, to allow the user of the web browser to interact with data objects within web pages, by tapping into the resources of powerful networks of remote computational services coupled to large data storage facilities.

Typically, a browser with an AJAX engine talks to an API interface that passes commands and data through to remote server-based code modules. Such modules routinely then access server-side databases and perform queries and computations on the database before sending computation results back for display to the user in the web page.

In these situations, the user's device acts simply as a client to the application code and centralized databases on the server side. Some systems use individual databases for each user. Such systems, however, simply provide each user access to a small individualized database, stored on the remote server as with other larger database systems.

This existing approach has been especially useful in the mobile device arena, where small handheld devices are often computationally- and resource-constrained. Existing systems provide users of such mobile devices with access to powerful remote computational and data storage resources.

In some cases, mobile users use these cloud-based applications to share files created on the local device with other users, by manipulating the files on the local device, and then uploading the files to various online sharing systems. To do this, the user typically employs an upload feature in a mobile app, to explicitly direct the app to upload the desired files, which then become available for others to access. If updates would be needed to be made to the shared files, the user would again edit the file on the local device, and then direct the app to upload a new copy of each changed file, thereby replacing the previously-uploaded files.

The current architecture of these prior cloud systems imposes a number of limitations on what can be accomplished using these services, some of these limitations include: 1) the labor-intensive manual-upload approach utilized results in limiting the currency of data that has been shared online, due to eventual resistance by the user to provide frequent updates; 2) the cumbersome data interchange mechanisms result in inefficient synchronization between client-side and server-side of cloud-based applications; 3) current systems limit each mobile app to being able to take advantage of only one cloud service at a time; 4) even though many existing cloud-based storage resources are quite large, they are inherently limited in that they make little use of the enormous collective storage capacity resident on billions of end users' mobile devices; 5) these prior systems follow a predominantly uni-directional data flow model; and, as a result, 6) server crash-and-restore systems use server-side backup files, which don't reflect changes made to client-side data during the crash-induced server downtime period.

In summary, due to their architectural limitations, existing cloud-based web and mobile-app application architectures can deliver a less-than-optimal user experience with respect to ease of use, responsiveness, seamlessness, and reliability.

BRIEF DESCRIPTION OF THE DRAWINGS

A further understanding of the nature and the advantages of particular embodiments disclosed herein may be realized by reference of the remaining portions of the specification and the attached drawings.

DETAILED DESCRIPTION OF ONE OR MORE EMBODIMENTS

The disclosure is particularly applicable to a scrapbooking cloud services system and it is in this context that the disclosure will be described in detail. It will be appreciated, however, that the system and method has greater utility since the system may be implemented in other manners that those shown in the figures and described below that are within the scope of the disclosure and the mobile supercomputing system and method may be used with any cloud services system such as the one shown in FIG. 1. Thus, the scrapbooking cloud services system is only a representative example of the type of cloud services system that may utilize the mobile supercomputing system and method described below.

Features and embodiments presented herein can improve upon the complexity regarding synchronization and sharing of data with others over the cloud. Embodiments can provide systems that can be quickly responsive to changes made to data on the client device, and which can automatically propagate those changes wherever needed. The system can combine the resources of multiple cloud services together with the computational and storage resources resident on the mobile device. In the system, the user's device can participate in completing the restoration of state on the server after catastrophic failure on the server-side.

One embodiment provides a method comprising the following acts performed by one or more processors: identifying a first plurality of cloud computing resources in a first cloud; associating a meta-cloud with the first cloud; and receiving a signal from a client device computing device to access at least one of the plurality of computing resources by using the meta-cloud.

Another embodiment provides an apparatus comprising: one or more processors; a non-transitory storage medium including instructions executable by the one or more processors for: identifying a first plurality of cloud computing resources in a first cloud; associating a meta-cloud with the first cloud; and receiving a signal from a client device computing device to access at least one of the plurality of computing resources by using the meta-cloud.

Another embodiment provides a non-transitory storage medium including instructions executable by one or more processors for: identifying a first plurality of cloud computing resources in a first cloud; associating a meta-cloud with the first cloud; and receiving a signal from a client device computing device to access at least one of the plurality of computing resources by using the meta-cloud.

Figure 1:
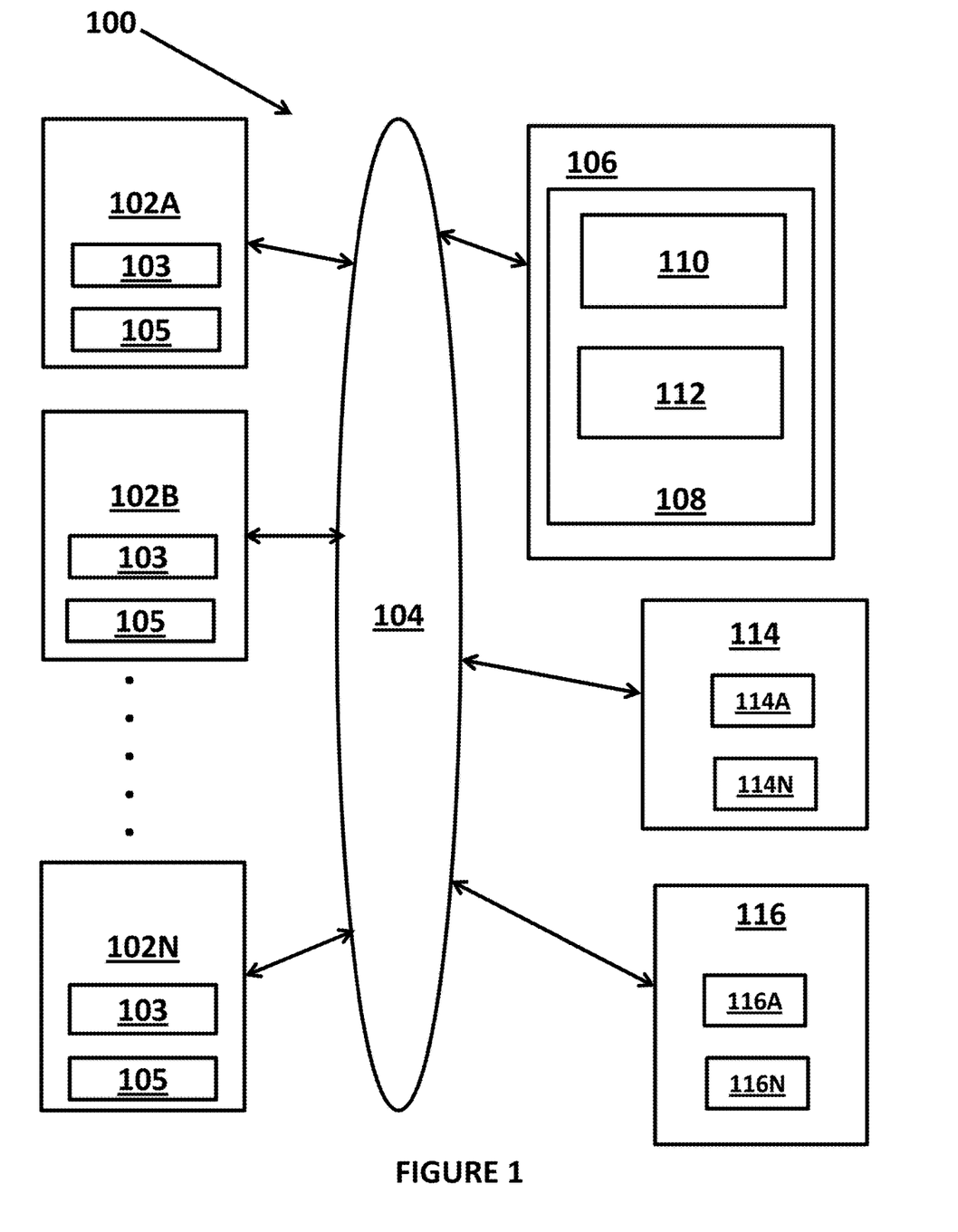
FIG. 1 illustrates an example of a cloud services system that incorporates a mobile supercloud component.

FIG. 1 illustrates an example of a cloud services system 100 that incorporates a mobile supercloud component. The mobile supercloud component may allow any cloud services systems to improve synchronization and sharing of data with others over the cloud and to automatically propagate those changes wherever needed, to combine the resources of multiple cloud services together with the computational and storage resources resident on the mobile device and to permit the user's device to participate in completing the restoration of state on the server after catastrophic failure on the server-side.

The system 100 may include one or more computing devices 102, such as 102A, 102B, . . . , 102N as shown in FIG. 1, that connect to and exchange data over a communications path 104 with a backend component 106 that may provide one or more cloud services. The backend component 106 may incorporate a mobile supercloud component 112 that provides the capabilities described above which are also described below in more detail.

Each computing device 102 may be a client that communicates with and uses the one or more cloud services. Each computing device 102 may be a processor based device with at least one processor, memory, persistent storage, a display and connectivity circuits that can be used by a user to connect to and interact with the backend and the one or more cloud services. For example, each computing device may be a smartphone device, such as an Apple® iPhone® or an Android® operating system based device, a tablet computer device, a personal computer device, a terminal device, a mobile device, a laptop computer device and the like. In some embodiments, each computing device 102 may store (or download) and use an application 103 that is a plurality of lines of computer code that may be executed by the processor of the computing device 102 to communicate with and interact with the one or more cloud services. The application may be a browser application, a mobile application or any other application. In one example of the system when used for scrapbooking, the application may be a Keepsayk™ app 100 or a web client 103 that is described in more detail below. The browser application may have a well-known Uniform Resource Locator (URL) address bar (address bar) that displays a URL address from which the browser application is retrieving data.

Each computing device 102 also may have one or more resources 105 that may be accessed and/or used by the system as described below. For example, each computing device may have a management resource such as component that can manage certain actions, a computational resource such as a processor, a graphics processor, a co-processor or a digital signal processor housed in the computing device and a data storage resource such as a memory or persistent storage in the computing device or a database or data store resident on the computing device. The one or more resources may further include a data file resource, network storage resource, a virtual filesystem resource, a virtual processor/CPU resource and a stored data resource.

The communications path 104 may be a wired communications path or wireless communications path or a combination of the two. For example, the communication path 104 may be Ethernet, the Internet, a wireless data network, a wireless computer data network, a wireless cellular data network, a computer data network and the like. The communication path may use various communication protocols, such as HTTP or HTTPS as well as various data transfer protocols, such as HTML, JSON to provide the communication path between the one or more computing devices 102 and the one or more cloud services hosted by and provided by the backend 106.

The backend component 106 may include one or more cloud services components 108 (only one is shown in FIG. 1 for clarity) and each cloud service component 108 may further have a web server component and an API server component 110 wherein the components of the cloud services component 108 communicate with each computing device 102 and provide the cloud service to each computing device 102. The backend component and its components may be implemented using one or more computing resources such as server computers, processors, memory, persistent storage components, blade computers and the like. Each of the components 108, 110 and 112 may be implemented in hardware or software. When a component is implemented in software, the component may be a plurality of lines of computer code that may be executed by a processor so that the processor is configured to perform the operations and functions of those components as described below. When a component is implemented in hardware, the component is a circuit, such as a programmable logic device, microcontroller, application specific integrated circuit and the like, that performs the operations and functions of those components as described below.

The system 100 may also have one or more other clouds 114, 116 that are also capable of being coupled to the communication path 104. Each cloud 114, 116 may further comprise one or more cloud resources 114A, . . . , 114N and 116A, . . . 116N that may be accessed by the system 100 as described below. The one or more cloud resources may include a management resource such as component that can manage certain actions, a computational resource such as a processor, a graphics processor, a co-processor or a digital signal processor and/or a data storage resource such as a memory or persistent storage in a computer or a database or data store capable of being coupled to a computer. The one or more cloud resources may further include a data file resource, network storage resource, a virtual filesystem resource, a virtual processor/CPU resource and a stored data resource.

The web server component and API server component 110 may receive data requests for each computing device (and more specifically each application 103 of each computing device) and exchange data with each computing device as described below with reference to FIG. 2 and respond to the data requests and provide code and data identifiers for the requested data. The mobile supercloud component 112, that may be resident on the backend component 106 and resident in each computing device 102 may implement the mobile supercloud within the cloud service system 100 in FIG. 1.

In one embodiment of a Mobile Supercloud (MSC), the system can extend the "cloud" to a client's device (computing devices 102) so that the computing device's computational and storage resources can act as an integrated extension to the cloud-based application environment of the system 100. Thus, it can treat the computing device 102 as a fully-functional computational and storage peer in a distributed application system. The system may use a network API to extend the cloud. The listing of the resources for each element of the extended cloud, including resources on the computing device, may be part of the network API. The system may also use a unique identifier and a shared secret for each resource as a technique for access control to each resource. The MSC 112 puts an abstracted layer over cloud resources so a particular Supercloud system is not restricted to any individual third-party cloud provider in any way or fashion. Interfacing with each cloud services provider requires just one interface module that may include an API that permits the MSC to access each cloud resource. For example, the MSC may have an integrated handler for each cloud service and a valid set of credentials from the current user (provided to the handler) to enable the MSC resource access for the user.

The MSC can require very little interface complexity on the part of the cloud services provider. As long as there's an API to the cloud resource that lets MSC check the file attributes (time and date) and that the MSC system can write to (and can get a callback) the MSC can sit on top of anyone's existing cloud service. This means there can potentially be an unlimited number of cloud services/resources that can be added to the system over time. When more than one cloud services system is integrated in this way, the MSC merges them into a single collective resource that the app 103 can utilize in providing the various facilities which it provides to the user. The multi-cloud integration capabilities of MSC create a meta-cloud, what might be described as a "cloud of clouds." Additionally, the meta-cloud can be combined with the ability of the MSC to also include the computational, data management and data storage capacity of the end user's computing device 102. Using the API and the interface, the MSC 112 may then associate a plurality of cloud resources with the meta-cloud and thus permit the app 103 to access/utilize any of the cloud resources that are part of the meta-cloud using the interface/API. In a particular example of the system shown in FIG. 3, the third party cloud service/resource may be a storage resource provided by Dropbox® that is part of the MSC. A Dropbox Sync API provides a virtual drive and a few callback functions to the app developer.

The MSC 112 can make use of individual end-user databases, with eventual consistency between an SQLite database resident on each computing device 102 and a corresponding eventually-mirrored database 114A on the server-side since both are resources that may be part of the meta-cloud. This approach can make the resident database on the computing device 102 an integral part of the distributed MSC application system. Thus, a user uses the app 103 and accesses the local SQLite database on the computing device 102 repeatedly and changes the content in the local SQLite database. When this occurs, for example, when the user makes a change to a piece of content, the change may be reflected back to the storage resources of the system and to the user's personal copy of the database on the backend 106 or coupled to the backend. An advantage of this approach is that, if the primary MSC storage resource, such as a database server external to the computing device 102, goes down, the local database, that may be within the app 103, can restore the primary MSC storage resource and bring the primary MSC storage resource up to date, insuring that the user can continue to work without interruption and have all of his or her changes immediately reflected in the system. Furthermore, the restore capability can be bi-directional, as well so that, if the computing device 102 is ever lost, stolen, or damaged, the MSC architecture allows for the easy automatic restoration of the device-resident database to its previous state. The above restoring is made possible since each app 103 may communicate with the backend 106 (using APIs and interfaces). This approach provides the user with the functionality of a personal database in the cloud, with seamless and instant reflection of data changes from the mobile device to the server, while also providing the redundancy, backup, and fail-over advantages more typical of enterprise-class database systems. As a result of this design, the computing device can become a single point of reference to what the data state of the master copy of the database should be.

Now, an example of the scrapbooking cloud system that incorporates the MSC and the data and asset flow in the scrapbooking cloud system is described in more detail. In the scrapbooking cloud system, the app 103 may be a "The Keepsayk app". In this example, the app 103 may display the "preparing to upload" message to the user. When that occurs, the MSC steps through each of the user's scrapbook media asset files, determines if the file needs to be written to Dropbox, uploads the file to Dropbox if the determination is positive, and initiates the eventual synchronization of the client database with its counterpart on the MSC database server. For example, the Keepsayk app 103 on each computing device 102 may access its local SQLite database repeatedly during the user's operation of the mobile app. When this occurs, for example, when the user makes a change to a publicly-shared scrapbook, the change is reflected back to the server to the user's personal copy of the database on the server.

Figure 2:
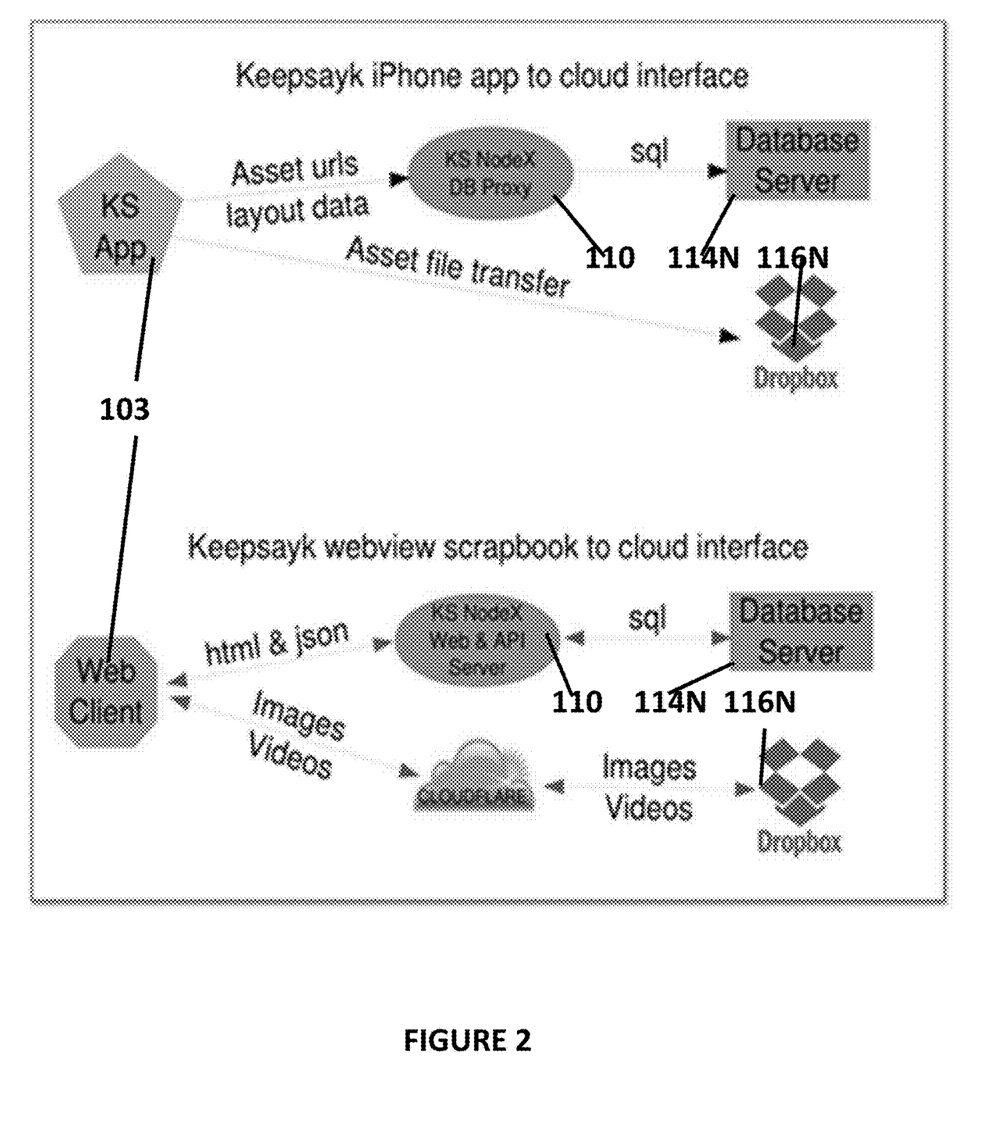
FIG. 2 illustrates data and asset flow in an example embodiment of the cloud services system when the cloud services system is a scrapbooking system.

FIG. 2 illustrates data and asset flow in an example embodiment of the cloud services system when the cloud services system is a scrapbooking system. The top diagram shows the app-to-cloud interface, while the bottom diagram shows the webview-to-cloud interface. In the (top) app-to-cloud interface diagram of FIG. 2, it is shown that the following processes occur as the Keepsayk mobile app 103 communicates with a storage resource 114N, such as a database server.

1) The Keepsayk app 103 on the computing device 102 sends pieces of data, such as layout data, caption and text post data, and asset URLs for each piece of data to the node/web server 110. The asset URLs identify the location of each piece of data since those pieces of data may reside on any of the storage resources, such as DropBox as shown in FIG. 2, that are part of the meta-cloud.

2) The app 103 also uploads photo and video asset files to the end-user's account on the storage resource 114N, such as Dropbox.

3) the node/web server 110 may update the user's database tables on the storage resource of the system 114N, such as a database server, via eventual consistency synchronization as described above.

In the bottom diagram of FIG. 2, the data flow in the webview-to-cloud interface is illustrated:

1) the web client 103 sends a web page request to the node/web server 110 for a web view of the scrapbook 2) the node/web server 110 makes an sql call via the webapi module to the storage resource 114N, such as a database server as shown in FIG. 2, which then returns the sql query results to the node/web server 110.

3) the node/web server 110 uses the returned data to build json code for the scrapbook layout;

4) the node/web server 110 returns the scrapbook layout as json code and Keepsayk asset ID data URLs to the web browser.

5) the web browser 103 loads images by requesting Keepsayk asset IDs via URL request to the node/web server 110.

6) the node/web server 110 responds for each asset ID request with a 301 redirect pointing directly to the Dropbox location of the asset; and 7) The web browser 103 loads each image or video asset directly from Dropbox.

The use of 301 redirects shown in step 6 allows for the deployment of efficient web services for a vast number of services without the performance impact and infrastructure requirements that other typical media-rich web-based cloud applications have needed. When this approach is then put together with the layering of multiple third-party cloud services a synergistic combinations results. The data-link-redirection design technology is described in more detail in co-pending, commonly owned U.S. patent application Ser. No. 14/749,353 filed on the same day herewith which is incorporated herein by reference. The data-link-redirection allows the MSC to scale the amount of accessible storage without the consequential complexity of having to manage the storage and bandwidth directly, system growth without friction.

The mapping of each resource by the MSC may be performed by a mapping component of the MSC, that may be a plug-in, that handles one particular cloud vendors's API and protocol. Thus, the MSC may have a plurality of mapping components that handle each API/protocol. These mapping components of the MSC may be executed on the backend component 106.

Figure 3:
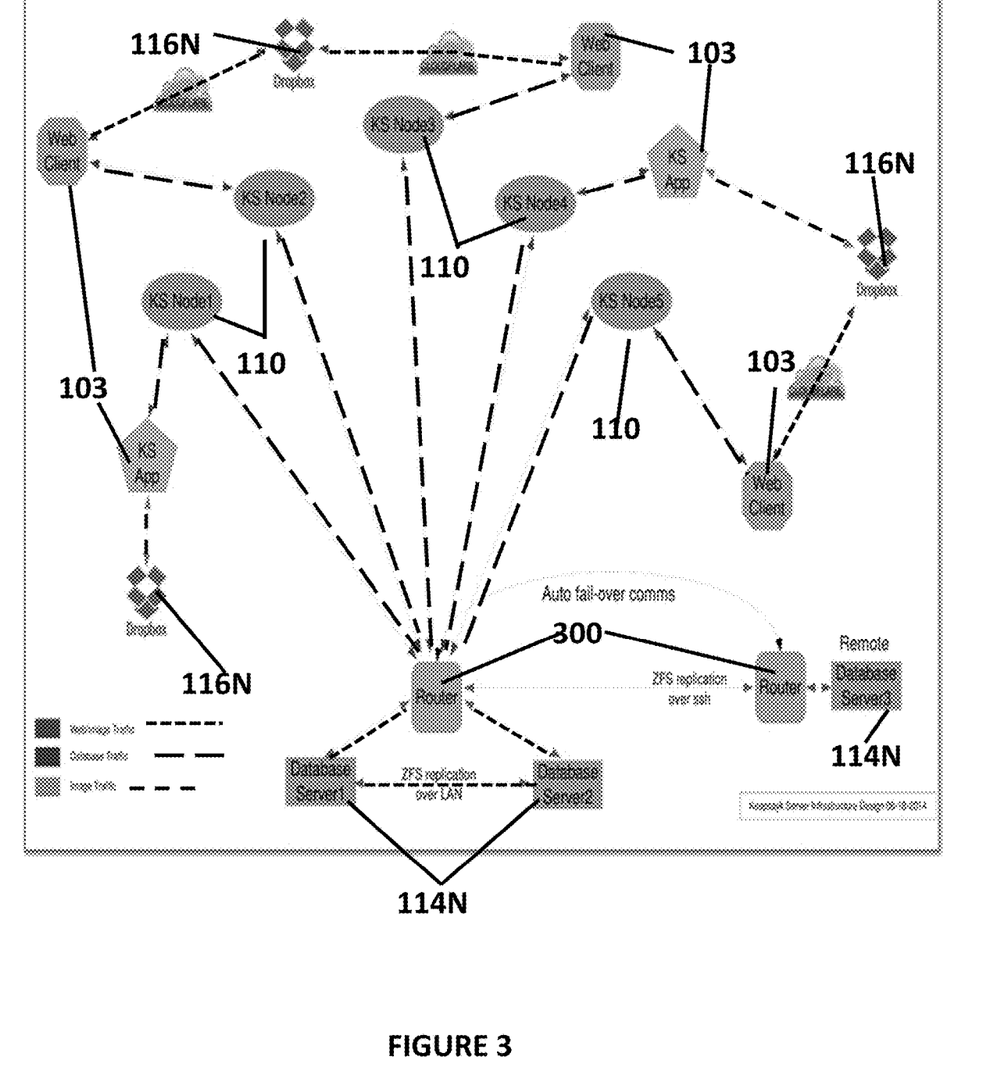
FIG. 3 illustrates an example mobile supercloud arrangement for the scrapbooking system example shown in FIG. 2.

FIG. 3 illustrates an example mobile supercloud arrangement for the scrapbooking system example shown in FIG. 2. In FIG. 3, a long dashed line ( ----- ----- )shows the database-related communications traffic, a dotted line ( - - - ) shows web-based communications traffic and a shorter dashed line ( -- -- -- ) shows image and/or video asset file transfer traffic. In this example, the system may have a plurality of nodes 110 as shown.

In the example, the app 103, such as a Keepsayk (KS) app in this example, on each computing device 102 communicate with the nodes 110, that may be node servers in this example. These nodes 110 are extremely lightweight hybrid servers, which act as either database/API servers or as very lightweight web servers, depending upon the context of the client making a request to the server, as described in the discussion regarding FIG. 2 above. The node servers 110, in turn send sql commands to the storage resource 114N, such as a database server in this example, which respond with table data resulting from the execution of the sql commands. The storage resource 114N is backed up via ZFS replication over the local LAN through to a secondary local server/router 300, and is also replicated via ZFS replication over cryptographically-secure ssh channels to a tertiary offsite remote server. If the primary storage resource 114N ever goes down, the secondary server takes over, and is brought up to date by the device-resident personal database, for each Keepsayk user. The Keepsayk app 103 also communicates directly to the third-party-cloud service, in this example Dropbox, to upload photo and video media assets.

For shared scrapbooks, the web client 103 may make a scrapbook web page request to the node server 110, which then sends an sql command to the database server 114N. The database server 114N responds with table data which is used to feed a j son generator module within the node server 110. This j son data is then sent back to the web client 103, and is interpreted into Javascript-accessible data on the web client 103. The web client 103 then issues URL requests to the node server 110 for the photo and video image assets required for the desired scrapbook, the node server 110 then responds by sending the web client 301 redirects pointing the web clients directly to the third-party cloud service URLs corresponding to the locations on, for example, Dropbox, for those media assets. Load among the node servers is balanced through the use of a round-robin DNS facility. Further, web caching services, such as Cloudflare, are also utilized to improve the large-scale performance of the web communications.

In one embodiment, nothing in the central core of the MSC need communicate directly with the third-party cloud service. Only the mobile apps and the web clients 103 ever need to communicate with those services. The Keepsayk MSC can extend the concept of cloud-based web applications to include the user's mobile device as a seamless part of the distributed cloud-based application and datastore. Further, it can allow a plurality of third-party cloud services to be multiplexed into extremely large media storage and transmission capability which can be transparently utilized by both the Keepsayk apps and web clients to provide high-performance rich interactive experiences to a virtually unlimited number of users.

It also can extend these third-party resources by integrating the user's own local device resources into the cloud. In this way, it allows the creation of a new generation of cloud-based applications that can tap into the enormous collective resources of billions of end-users' mobile devices to provide application functionality that gives a seamless continuity between user edits and updates to data and representations of data that have been shared online for widespread dissemination.

Although the description has been described with respect to particular embodiments thereof, these particular embodiments are merely illustrative, and not restrictive. For example, although details of particular application specific interfaces, languages and other resources and/or components may be mentioned, it should be apparent that embodiments may be adaptable for use with other types of resources and components.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible, or non-transitory, medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A cloud resource system, comprising:
   a mobile computing device including a processor and a memory;
   at least a part of a distributed application executed by the processor to communicate with a mobile supercloud component coupled to one or more remote computing devices;
   the mobile supercloud component being configured to identify a plurality of cloud computing resources in a cloud connected to the Internet, associate the plurality of cloud computing resources with a meta-cloud, map at least one of the plurality of cloud computing resources to at least one meta-cloud computational resource located on the mobile computing device wherein the at least one meta-cloud computational resource is a database application, receive a request via a communication path, from at least one remote part of the distributed application, to access the at least one said meta-cloud computational resource and cause a transfer of a location of a meta-cloud resource to enable the distributed application to access said meta-cloud resource from the at least one said meta-cloud computational resource in response to the request to the request;
   wherein one or more parts of the distributed application on one or more of the one or more remote computing devices is configured to change a piece of information in the database application; and
   wherein the mobile supercloud component is further configured to synchronize the changed piece of information in the database application with a database server remote from the mobile computing device, to synchronize a changed piece of data in a database server with a database resident on the mobile computing device with a database application resident on the mobile computing device and to restore a database server using the database application.

2. The system of claim 1, wherein the mobile supercloud component is further configured to restore the database application using a database server remote from the mobile computing device.

3. The system of claim 1, wherein the mobile supercloud component is further configured to map at least one of the plurality of cloud computing resources to at least one meta-cloud storage resource located on the mobile computing device.

* * * * *